(12) United States Patent
Gotoh

(10) Patent No.: US 6,222,635 B1
(45) Date of Patent: Apr. 24, 2001

(54) PRINT DATA CONTROL SYSTEM

(75) Inventor: Nobuyuki Gotoh, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/096,410

(22) Filed: Jun. 11, 1998

(30) Foreign Application Priority Data

Jun. 12, 1997 (JP) .................................................. 9-171113

(51) Int. Cl.[7] .................................................. G06F 13/14
(52) U.S. Cl. .......................................... 358/1.15; 358/298
(58) Field of Search ................................... 358/1.9, 1.13, 358/1.1, 1.15, 448, 404, 500, 530, 296, 442, 468, 437, 444, 440, 407, 1.16, 1.17, 75, 298, 534, 520; 345/501, 505, 506; 382/303, 304

(56) References Cited

U.S. PATENT DOCUMENTS 5,402,245 * 3/1995 Motta et al. ........................... 358/298
5,471,563 * 11/1995 Dennis et al. ....................... 358/1.15
5,471,564 * 11/1995 Dennis et al. ....................... 358/1.15

FOREIGN PATENT DOCUMENTS

| 4-67964 | 3/1992 | (JP) . |
| 6-199000 | 7/1994 | (JP) . |
| 7-334318 | 12/1995 | (JP) . |
| 8-328789 | 12/1996 | (JP) . |
| 9-9084 | 1/1997 | (JP) . |

* cited by examiner

Primary Examiner—Jayprakash N. Gandhi
Assistant Examiner—Thanh Y. Tran
(74) Attorney, Agent, or Firm—Ostrolenk, Faber, Gerb & Soffen, LLP

(57) ABSTRACT

In a print control method for a host computer and a printer, a plurality of process steps for print data are stored in both the host computer and the printer. The host computer determines a process step which produces a minimum amount of transfer data with respect to an attribute of an input data. The host computer executes process steps starting from an initial process step to the determined process step to produce incompletely-processed data which is transferred to the printer. The printer executes the remaining process steps to produce completely-processed data.

19 Claims, 7 Drawing Sheets

PRINT DATA CONTROL SYSTEM

BACKGROUND OF THE INVENTION

1. Field of the invention

The present invention generally relates to a print data control system, and in particular to system and method for processing and transferring data from a host computer to a printer.

2. Description of the Related Art

There have been proposed several methods which expands print data to bit-map data at a high speed. For example, a print control method for a page printer has been disclosed in Japanese Patent Unexamined Publication No. 4-67964. According to this print control method, print data is mapped onto a bit-map memory by selectively using a mapping software program and a mapping-dedicated hardware circuit depending on conditions of print data.

However, under the limited transfer capability of an interface between a host computer and a printer, such an increasing speed of data mapping cannot provide expected performance. In other words, the interface produces a bottleneck in high-speed printing process.

Especially, in the case of a large amount of data such as full-color print data, the print speed is remarkably reduced. Further, in the case of print data including both full-color image ata and text data, the whole print speed cannot lead to reduced print time because it is difficult to reduce the time required to mapping the full-color image data.

SUMMARY OF THE INVENTION

An object of the present invention is to provide print data control system and method which can achieve high-speed printing in the case of a large amount of print data.

Another object of the present invention is to provide print data control system and method which can achieve high-speed data transfer from a host computer to a printer.

According to the present invention, a predetermined process for print data is stored in both the host computer and the printer and the predetermined process is shared between the host computer and the printer by transferring data from the host computer to the printer. Since the load of the predetermined process is shared between the host computer and the printer, resulting in high-speed printing.

According to a first aspect of the present invention, the print data process is shared between a host computer and a printer so as to minimize the amount of transfer data from the host computer to the printer. Therefore, the high-speed data transfer is achieved from the host computer to the printer.

According to a second aspect of the present invention, in a data processing method for processing input data to transfer processed data from a first processor to a second processor which are connected through an interface, at the first processor, a plurality of process steps are stored which are to be sequentially executed to produce output data. After determining a process step producing a minimized amount of processed data transferred to the second processor with respect to a predetermined attribute of the input data, a first sequence of process steps from an initial process step to the process step is executed to produce incompletely-processed data. And, the incompletely-processed data to the second processor is transferred to the printer. At the second processor, the process steps are stored and a second sequence of process steps following the process step is executed to produce the output data.

According to a third aspect of the present invention, in a system including a host computer and a printer which are connected through an interface, full-color input data is processed to produce full-color print data. At the host computer, a plurality of color process steps are stored which are to be sequentially executed to convert the full-color input data to the full-color print data. The host computer determines a data-minimizing color process step producing a minimized amount of processed data transferred to the printer with respect to a resolution of the full-color input data and then executes a first sequence of color process steps from an initial color process step to the data-minimizing color process step to produce incompletely-processed data. The incompletely-processed data is transferred to the printer. At the printer, the color process steps are also stored and a second sequence of color process steps following the data-minimizing color process step is executed to produce the full-color print data which is used for printing.

DETAILED DESCRIPTION OF THE PREFERRED EMBODIMENTS

Figure 1:
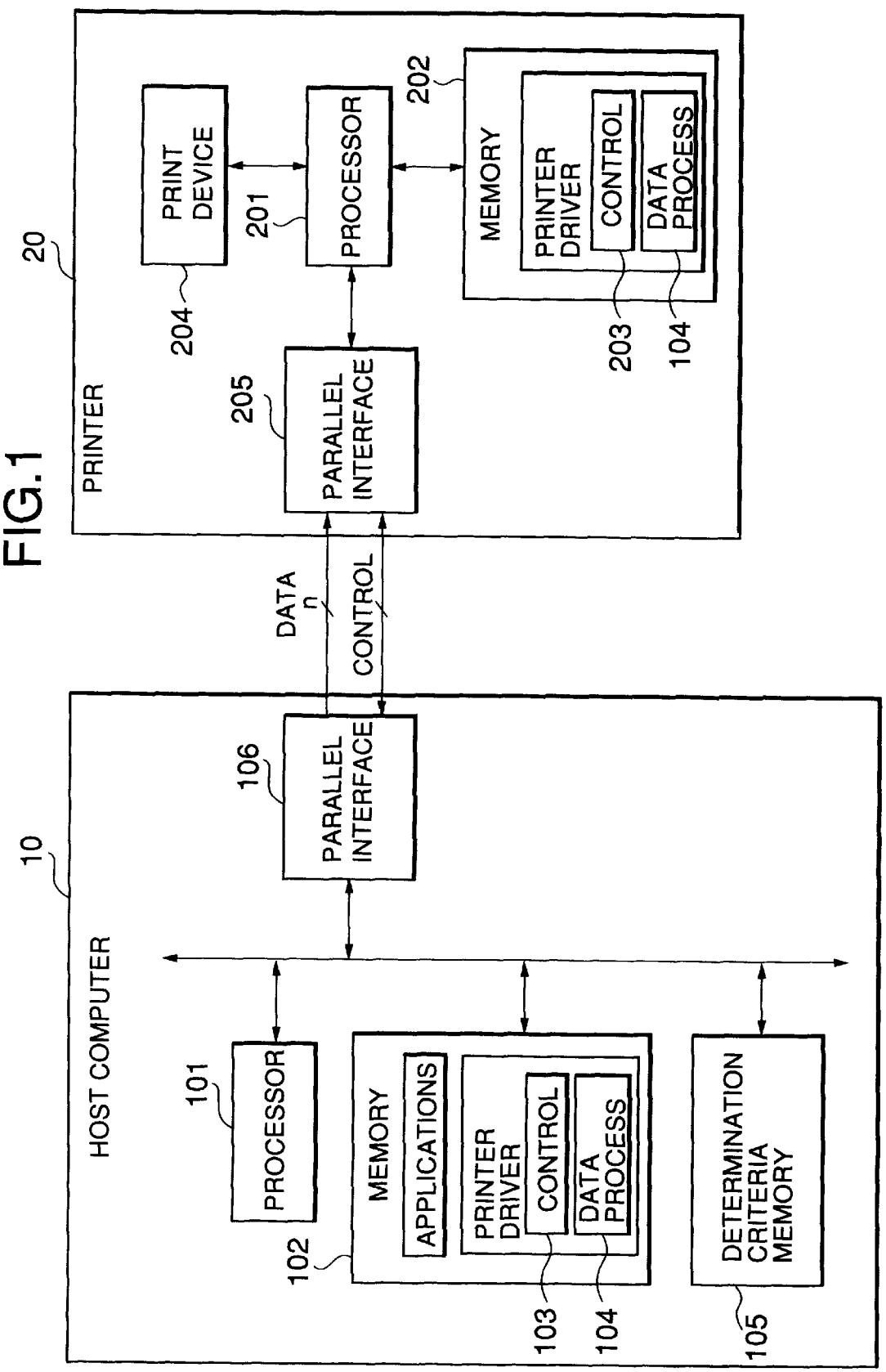
FIG. 1 is a block diagram showing a host computer connected to a printer according to an embodiment of the present invention.

Referring to FIG. 1, a host computer 10 is connected to a printer 20 through a printer cable with connectors usually conforming to the Centronics standard. The host computer 10 includes a processor 101 and a memory 102 which stores a plurality of applications and printer driver programs one of which is a printer driver program dedicated to the printer 20. The printer driver program dedicated to the printer 20 includes a control program 103 and a data process program 104.

Further, the host computer 10 is provided with another memory 105 which stores determination criteria in a predetermined form such as formula or table, which are produced based on changes in the amount of data produced by each of process steps for each printer to be used. The determination criteria memory 105 may store a plurality of criteria including a criterion corresponding to the printer 20 connected to the host computer 10.

As will be described later, the data process program 104 of the printer driver program consists of a plurality of process steps each performing predetermined print data processing. The process steps are sequentially executed to expand print data into bit-map print data for the printer 20. The print data is produced by an application running on the processor 101 and is used as input data by the printer driver program dedicated to the printer 20.

When the print data is produced, the processor 101 starts the control program 103 running to determine a process step which produces the minimum amount of processed data based on the criteria stored in the determination criteria memory 105. After the process step is determined, the processor 101 sequentially executes the data process program 104 until the determined process step has been executed. The resultant data which may be incompletely processed is transferred to a parallel interface 106 to be sent to the printer 20.

The printer 20 includes a processor 201 and a memory 202 which stores a printer driver program of the printer 20. The printer driver program includes a control program 203 and the data process program 104 which is the same as stored in the memory 102 of the host computer 10. That is, the data process program 104 of the printer 20 also consists of the process steps each performing predetermined print data processing and they are sequentially executed to expand input print data into bit-map print data. Based on the bit-map print data, the processor 201 of the printer 20 controls a print device such as laser printing device, inkjet printing device or the like. The input print data is received at a parallel interface 205 from the host computer 10 according to the predetermined parallel interface protocol.

As described before, the printer 20 will receive incompletely-processed print data from the host computer 10 in most cases. When receiving the incompletely-processed print data from the host computer 10, the processor 201 starts the control program 203 running to execute the remaining process steps following the process step determined by the host computer 10. In this manner, the processor 201 produces the completely-processed print data, that is, bit-map print data.

The details of print data processing will be described hereinafter assuming the data process program 104 consisting of N process steps $P_1$–$P_N$ which are to be sequentially executed.

Figure 2:
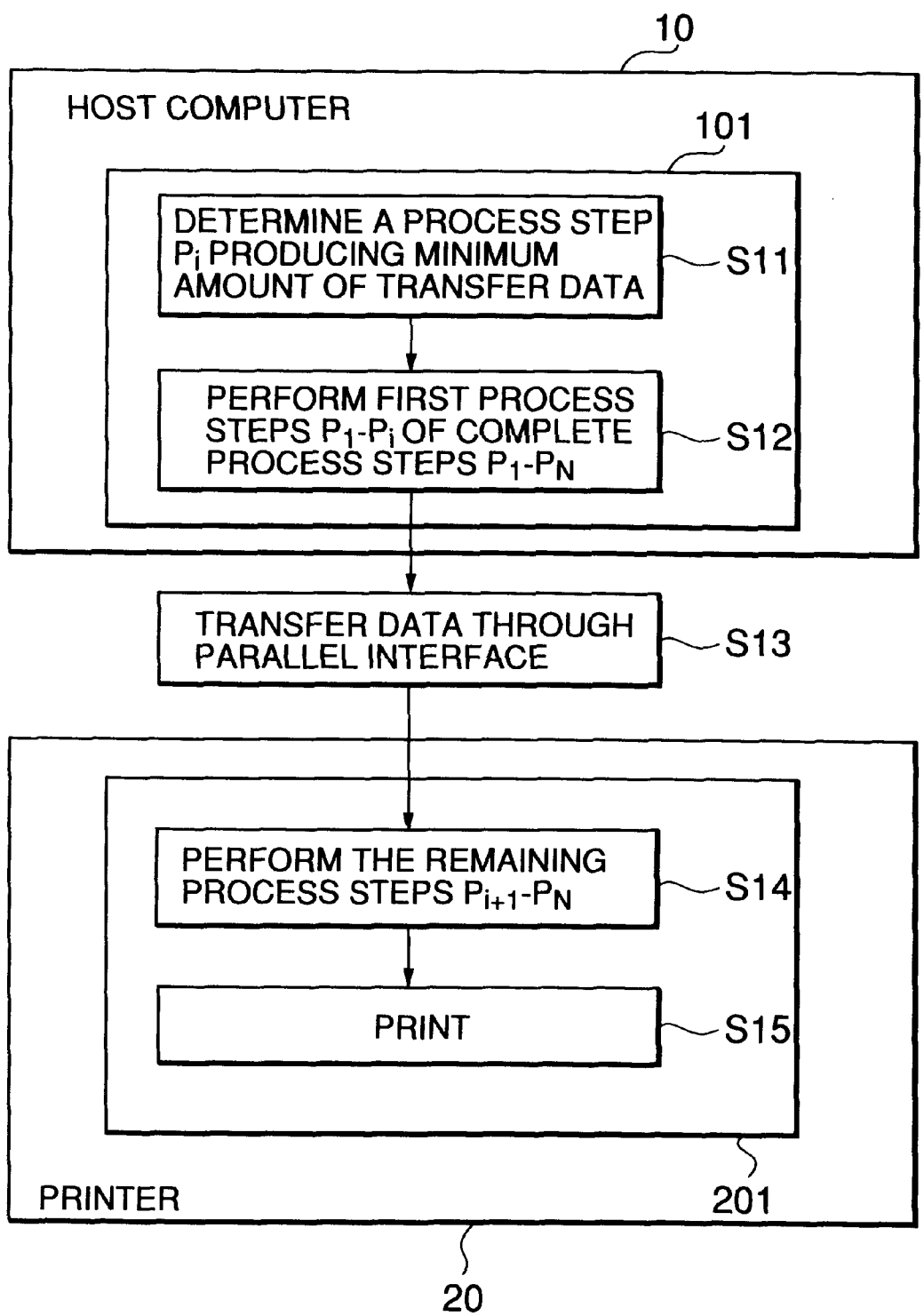
FIG. 2 is a schematic flow chart showing the process sharing of a print data control method according to an embodiment of the present invention.

Referring to FIG. 2, when the print data is produced, the control program 103 runs to determine a process step $P_i$ ($1 \leq i \leq N$) which produces the minimum amount of processed data based on the criteria stored in the determination criteria memory 105 (step S11). After the process step $P_i$ is determined, the process steps $P_1$–$P_i$ of the N process steps $P_1$–$P_N$ are sequentially executed to produce the transfer data (step S12). The transfer data is incompletely processed but the amount thereof is minimized. Therefore, the transfer data is transferred through the parallel interfaces 106 and 205 to the printer 20 at a high speed (step S13).

When receiving the incompletely-processed print data from the host computer 10, the processor 201 of the printer 20 executes the remaining process steps $P_{i+1}$–$P_N$ following the process step $P_i$ which has been executed by the host computer 10 (step S14). In this manner, the completely-processed print data is produced and then printed by the print device 204 of the printer 20 (step S15).

Taking a color conversion process as a typical example, the details will be described hereinafter referring to FIGS. 3—5.

Figure 3:
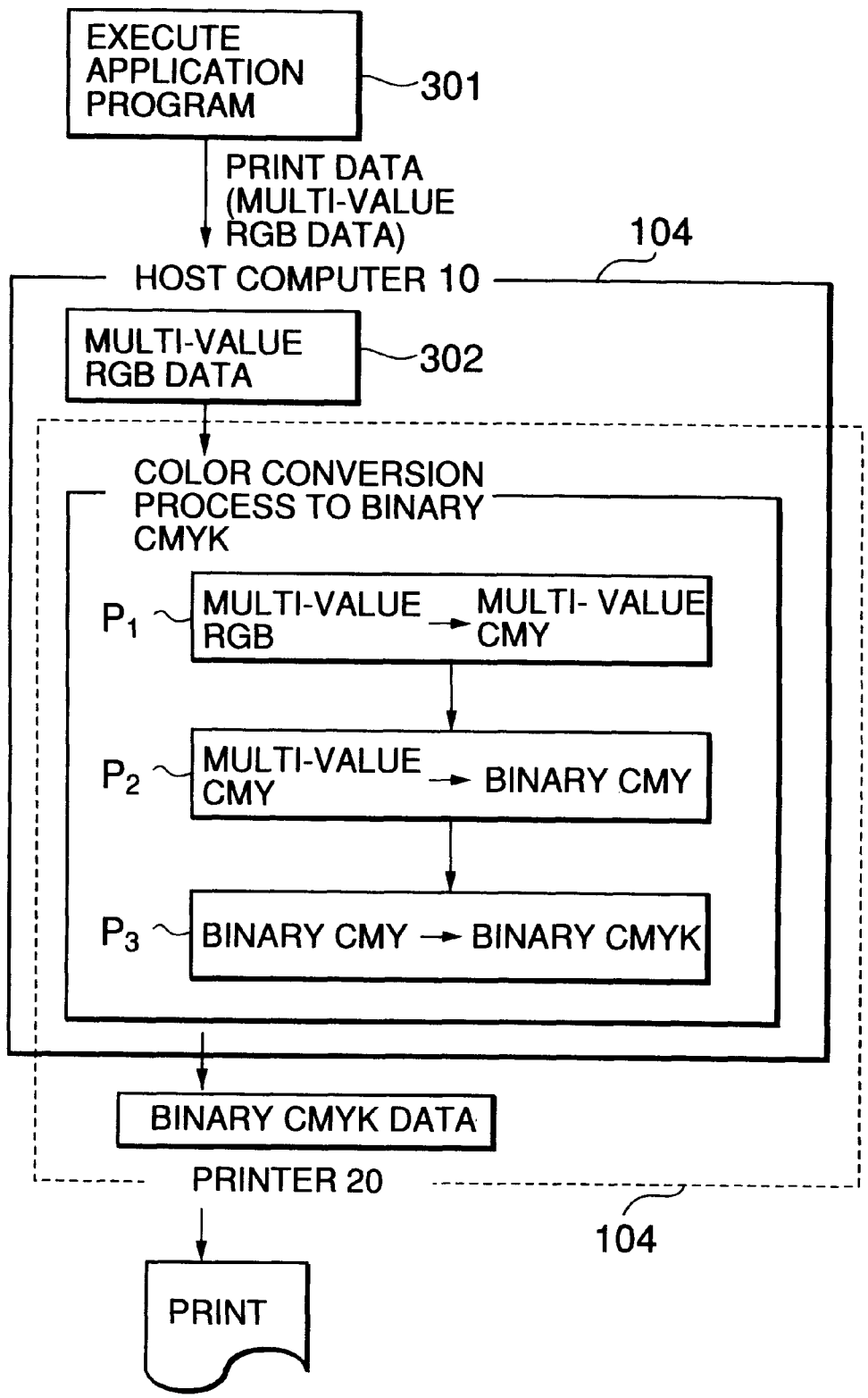
FIG. 3 is a schematic flow chart showing a color conversion process which can be performed in the host computer and the printer in the print data control method.

Referring to FIG. 3, the data process program 104 stored in both the host computer 10 and the printer 20 is a color conversion process consisting of three process steps $P_1$–$P_3$.

In the case where an application program 301 running on the processor 101 produces the print data of multi-value RGB (red R, green G and blue B), the first process step $P_1$ converts the multi-value RGB data 302 to multi-value CMY data, where C is Cyan, M is Magenta and Y is yellow. The second process step $P_2$ converts the multi-value CMY data to binary CMY data. The third process step $P_3$ converts the binary CMY data to binary CMYK data according to well-known black generation method, where K is black. The binary CMYK data 303 is output to the print device 204.

Figure 4:
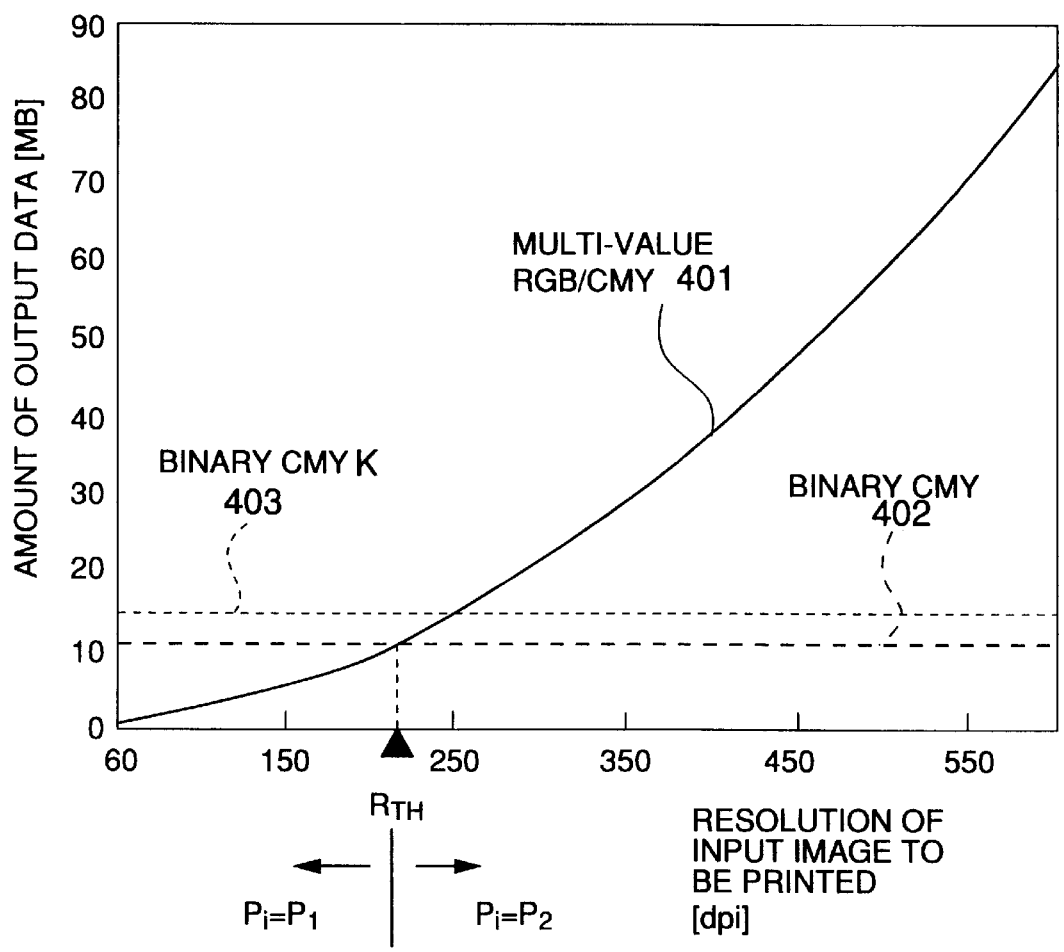
FIG. 4 is a graph showing the amount of data produced by each process step depending on the resolution of an input image.

Referring to FIG. 4, the amount of data produced by each of the process steps $P_1$–$P_3$ varies with the resolution of an input image to be printed. More specifically, the amount of the multi-value RGB data is increased as indicated by a curve 401 with the resolution R of the input image to be printed. In this case, the amount of the multi-value RGB data is increased from approximate 1 MB to 85 MB. The amount of the multi-value CMY data produced by the process step $P_1$ is also increased as indicated by the curve 401 with the resolution R of the input image.

On the other hand, the amount of the binary CMY data produced by the process step $P_2$ is hardly changed as indicated by the curve 402 with the resolution R of the input image. In this case, the amount of the binary CMY data is on the order of 10 MB. The amount of the binary CMYK data produced by the process step $P_3$ is increased as compared with that of the binary CMY data. However, it is hardly changed as indicated by the curve 403 with the resolution R of the input image.

Therefore, there is a point of intersection of the curves 401 and 402. The resolution $R_{TH}$ at the intersection point is used as a criterion to determined the process step $P_i$ which produces the minimum amount of transfer data. Such a criterion may be stored in the determination criteria memory 105 of the host computer 10. A relationship such that the amount of data produced by each of the process steps $P_1$–$P_3$ varies with the resolution of an input image to be printed may be stored in the determination criteria memory 105 so that the criterion can be produced based on the relationship as shown in FIG. 4.

When the resolution of input image to be printed is lower than the resolution $R_{TH}$, the amount of the multi-value CMY data (curve 401) produced by the process step $P_1$ is smaller than that of the binary CMY data (curve 402) produced by the process step $P_2$. Therefore, the process step $P_1$ is determined as process step $P_i$ which produces the minimum amount of transfer data. On the other hand, in the case where the resolution of print data is not lower than the resolution $R_{TH}$, the amount of the binary CMY data (curve 402) produced by the process step $P_2$ is smaller than that of the multi-value CMY data (curve 401) produced by the process step $P_1$. Therefore, the process step $P_2$ is determined as process step $P_i$ which produces the minimum amount of transfer data.

Figure 5:
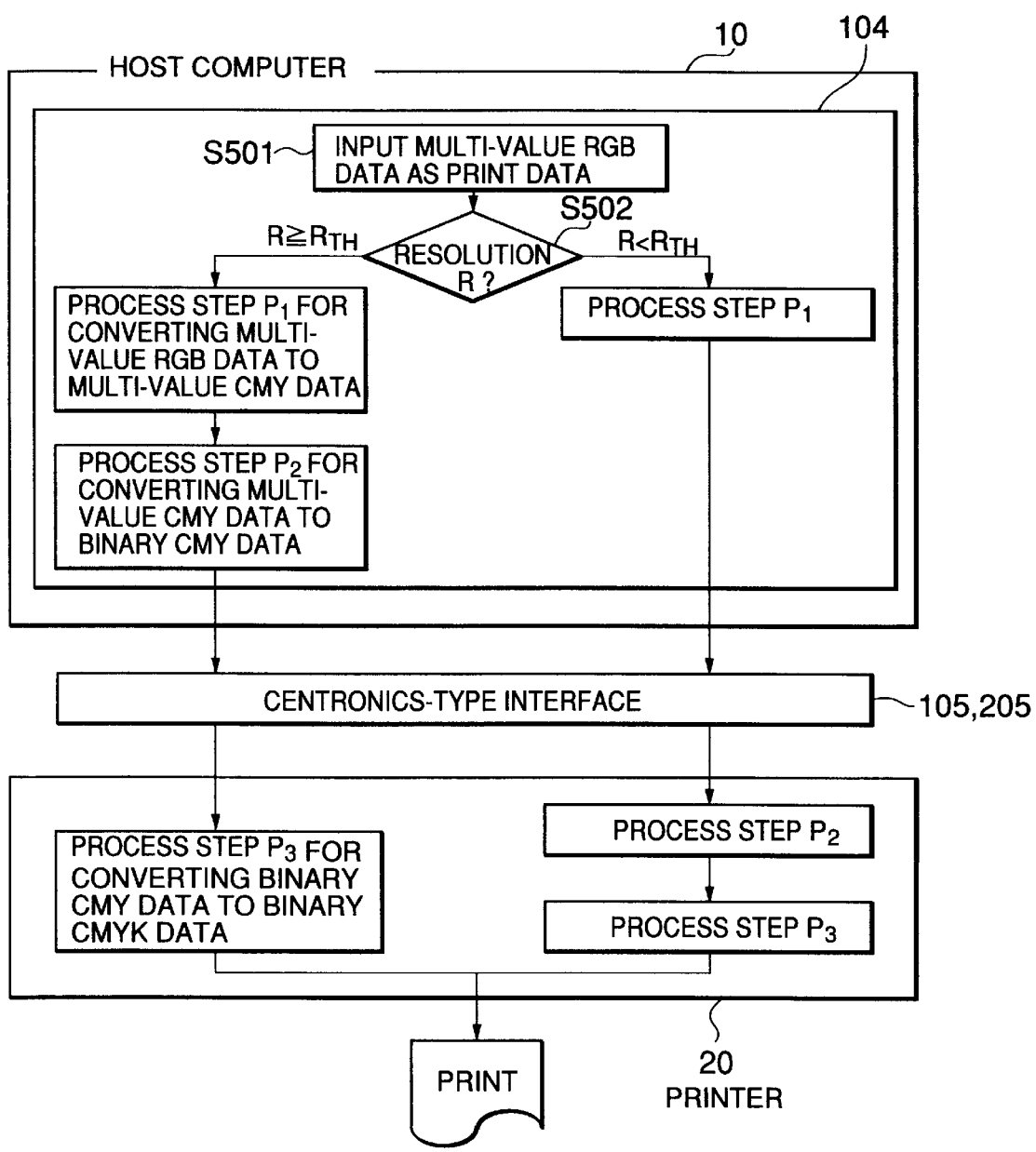
FIG. 5 is a flowchart showing an example of the process sharing in the case of the relationship corresponding to the graph of FIG. 4.

Referring to FIG. 5, when an application program running on the processor 101 produces the multi-value RGB data as print data and the printer driver receives the multi-value RGB data (step S501), the control program 103 is started and determines whether the resolution R of the multi-value RGB data is lower than the resolution $R_{TH}$ (step S502).

If the resolution R of the multi-value RGB data is lower than the resolution $R_{TH}$ (R<$R_{TH}$ in step S502), the multi-value RGB data is processed by the process step $P_1$ at the host computer 10 and then the resultant processed print data is transferred to the printer 20 through the Centronics-type interface. At the printer 20, the received processed print data is finally processed by the remaining process steps $P_2$ and $P_3$ to be converted to the binary CMYK data.

On the other hand, if the resolution R of the multi-value RGB data is not lower than the resolution $R_{TH}$ ($R \geq R_{TH}$ in step S502), the multi-value RGB data is processed by the process steps $P_1$ and $P_2$ at the host computer 10 and then the resultant processed print data is transferred to the printer 20 through the Centronics-type interface. At the printer 20, the received processed print data is finally processed by the remaining process step $P_3$.

For example, in the case of the resolution $R_{TH}$ of approximate 210 dpi (dots per inch) as shown in FIG. 4, the print data of a low-resolution image of 100 dpi is processed by the process step $P_1$ at the host computer 10 and then the resultant processed print data is transferred to the printer 20 through the parallel interface. At the printer 20, the received processed print data is finally processed by the remaining process steps $P_2$ and $P_3$ to be converted to the binary CMYK data. On the other hand, the print data of a high-resolution image of 400 dpi is processed by the process steps $P_1$ and $P_2$ at the host computer 10 and then the resultant processed print data is transferred to the printer 20 through the parallel interface. At the printer 20, the received processed print data is finally processed by the remaining process step $P_3$.

Figure 6:
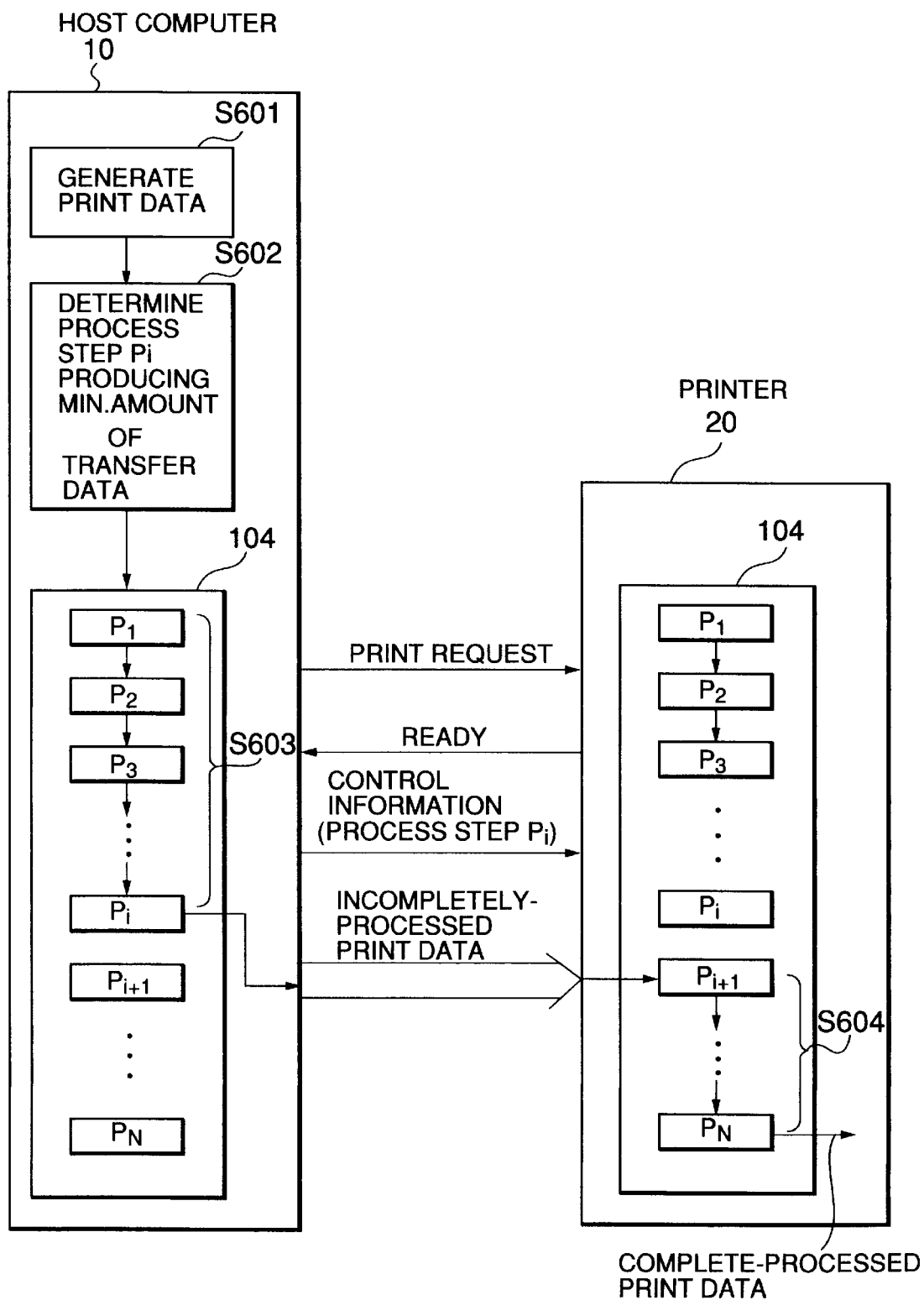
FIG. 6 is a diagram showing a sequence of process steps performed in the host computer and the printer in the case where a first print request is accepted by the printer.

As shown in FIG. 6, in the case of the data process program 104 consisting of N process steps $P_1$-$P_N$ which are to be sequentially executed, at the host computer 10, when the print data is produced (step S601), the control program 103 runs to determine a process step $P_i$ ($1 \leq i \leq N$) which produces the minimum amount of processed data based on the criteria stored in the determination criteria memory 105 (step S602). After the process step $P_i$ is determined, the process steps $P_1$-$P_i$ of the N process steps $P_1$-$P_N$ are sequentially executed to produce the transfer data which is incompletely processed but the amount thereof is minimized (step S603).

When the incompletely-processed print data has been produced, the control program 103 sends a print request to the printer 20. After receiving a ready-for-receiving signal from the printer 20, the control program 103 sends control information of the last process step (here, process step $P_i$) to the printer 20 before transferring the incompletely-processed print data to the printer 20 through the parallel interfaces.

When receiving the control information and the incompletely-processed print data from the host computer 10, the processor 201 of the printer 20 starts the control program 203 to determine which process step is to be executed following the process step $P_i$ which has been executed by the host computer 10. When the following process step (here, process step $P_{i+1}$) is determined, the control program 203 starts the remaining process steps $P_{i+1}$-$P_N$ (step S604). In this manner, the completely-processed print data is produced and then printed by the print device 204 of the printer 20.

Figure 7:
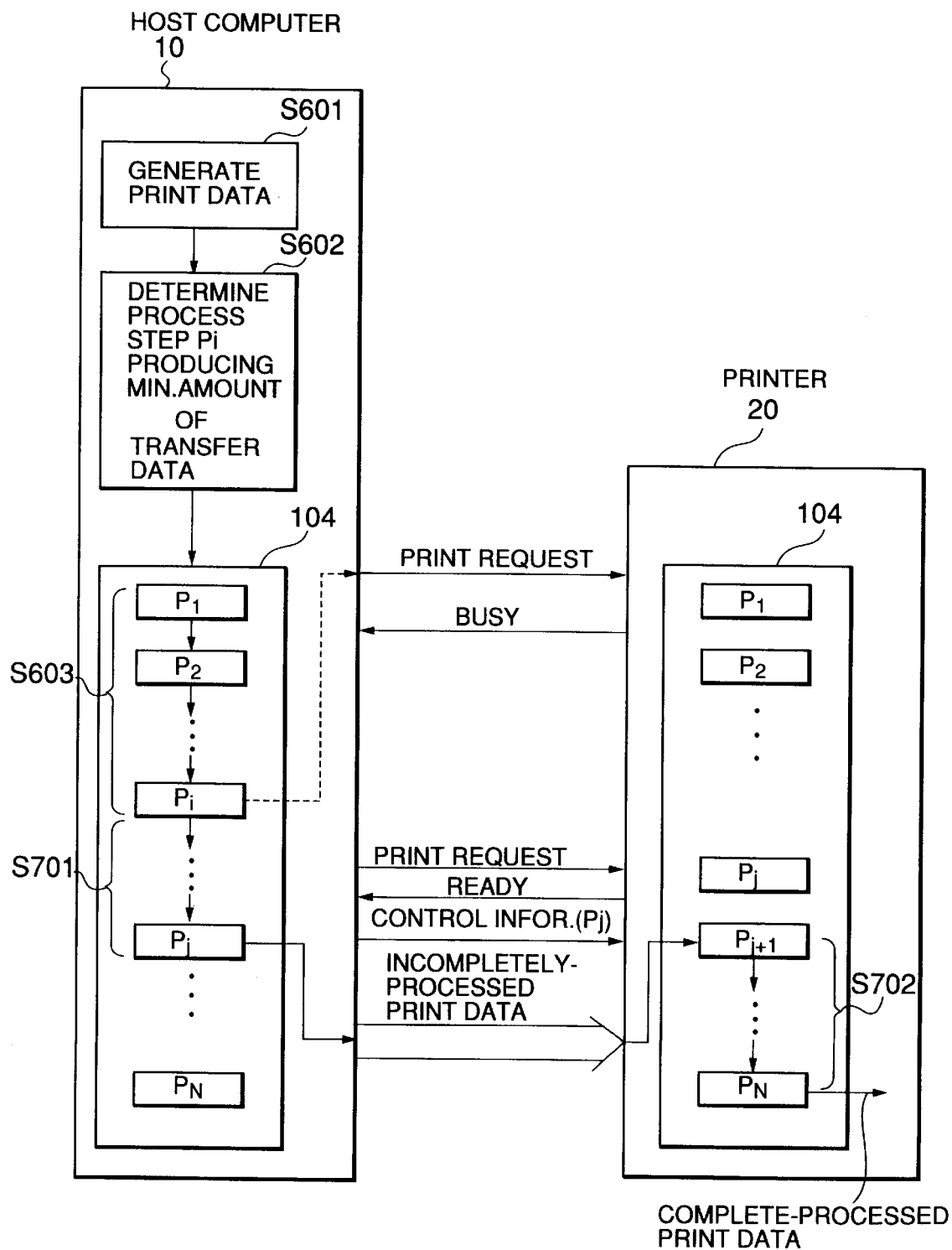
FIG. 7 is a diagram showing a sequence of process steps performed in the host computer and the printer in the case where a first print request is rejected and then a second print request is accepted by the printer.

As shown in FIG. 7, after the process step Pi is determined (step S602), the process steps $P_1$-$P_i$ of the N process steps $P_1$-$P_N$ are sequentially executed to produce the transfer data which is incompletely processed but the amount thereof is minimized (step S603). When the incompletely-processed print data has been produced, the control program 103 sends a print request to the printer 20.

If receiving a busy signal from the printer 20, the control program restarts executing process steps starting from the following process step $P_{i+1}$ for a predetermined period (step S701). After a lapse of the predetermined period, the control program 103 sends a print request to the printer 20 again. Such a sequence is repeatedly performed until a ready-for-receiving signal is received from the printer 20 or the last process step $P_N$ has been executed.

When receiving a ready-for-receiving signal from the printer 20, the control program 103 sends control information of the last process step (here, process step $P_j$) to the printer 20 before transferring the incompletely-processed print data to the printer 20 through the parallel interfaces.

When receiving the control information and the incompletely-processed print data from the host computer 10, the processor 201 of the printer 20 starts the control program 203 to determine which process step is to be executed following the process step $P_j$ which has been executed by the host computer 10. When the following process step (here, process step $P_{j+1}$) is determined, the control program 203 starts the remaining process steps $P_{j+1}$-$P_N$ (step S702). In this manner, the completely-processed print data is produced and then printed by the print device 204 of the printer 20.

Such a process sharing control can be achieved by storing the same process steps $P_1$-$P_N$ in both the host computer 10 and the printer 20. In the case where a plurality of documents to be printed are generated and printed by a printer such as a network printer, high speed printing can be achieved because each computer can execute process steps during the waiting time.

The present invention is not limited to the above embodiments. The printer 20 may be of binary CMY. Further, the determination criterion is not limited to the resolution of an input data. The area of an image included in the input data may be employed as a determination criterion. Anyway, it is important to find a process step which minimizes the amount of data.

What is claimed is:

1. A control method for a system including a host computer and a printer which are connected through an interface, comprising:

a) storing a same program for print data in both the host computer and the printer; and b) dividing execution of said program between the host computer and the printer by transferring execution from the host computer to the printer at a point between a beginning and an end of said program.

2. The control method according to claim 1, wherein b) comprises:

at the host computer, choosing said point in the program to divide the program into first and second parts which are to be sequentially executed to distribute execution between the host computer and the printer to provide a first processed data produced by the first part that is balanced with respect to execution between the host computer and the printer;

executing the first part of the program to produce the balanced first processed data; and transferring the balanced first processed data to the printer through the interface, and at the printer, executing the second part of the program to produce completely processed data.

3. The control method according to claim 1, wherein b) comprises:

at the host computer, determining a program position in the program so that data produced at the process position is balanced with respect to execution between the host computer and the printer;

executing the program until the program position has been executed to produce incompletely-processed data; and transferring the incompletely-processed data to the printer through the interface, and at the printer, executing the program following the process position to produce completely-processed data.

4. The control method according to claim 2, wherein the program comprises a plurality of processing commands which are divided into the first and second parts.

5. The control method according to claim 3, wherein the program comprises a plurality of processing commands from which the process position is determined as a processing command.

6. The control method according to claim. 1, wherein b) comprises the steps of:

at the host computer, b-1) determining a program position in the program so that data produced by executing the program until the process position is balanced with respect to execution between the host computer and the printer;

b-2) executing the program until the program position has been executed;

b-3) sending a print request to the printer when the program position has been executed;

b-4) executing the program following the program position to produce processed data when the print request is rejected;

b-5) transferring processed data to the printer through the interface when the print request is accepted, and at the printer, b-6) executing the program until the program has been completely executed.

7. The control method according to claim 6, wherein the program comprises a plurality of processing commands from which the program position is determined as a processing command.

8. A data processing method for processing input data to transfer processed data from a first processor to a second processor which are connected through an interface, comprising:

at the first processor, a) storing a plurality of commands which are to be sequentially executed to produce output data;

b) determining a command up until and including which execution of the stored sequential commands produces processed data transferred to the second processor such that an amount of the processed data is balanced between the first processor and the second processor with respect to an attribute of the input data;

c) executing a first sequence of commands from an initial command to the determined command to produce incompletely-processed data; and d) transferring the incompletely-processed data to the second processor, and at the second processor, e) storing the commands of a); and f) executing a second sequence of commands following the determined command to produce the output data.

9. The data processing method according to claim 8, wherein the determined command is determined based on a change in an amount of data produced by each of the commands with respect to the attribute of the input data.

10. The data processing method according to claim 9, wherein the attribute is a resolution of the input data.

11. The data processing method according to claim 9, wherein the attribute is an area of an image included in the input data.

12. A print control method for processing full-color input data to produce full-color print data in a system including a host computer and a printer which are connected through an interface, comprising:

at the host computer, a) storing a plurality of color program processes which are to be sequentially executed to convert the full-color input data to the full-color print data;

b) determining an individual program process producing an amount of processed data transferred to the printer that permits balanced execution between the host computer and the printer with respect to a resolution of the full-color input data;

c) executing a first sequence of color program processes from an initial color program process to the individual program process to produce incompletely-processed data; and d) transferring the incompletely-processed data to the printer, and at the printer, e) storing the color program process of a);

f) executing a second sequence of color program processes following the individual program process to produce the full-color print data; and g) printing output depending on the full-color print data.

13. The print control method according to claim 12, wherein the program processes comprise:

a first program process for converting multi-value RGB data of the full-color input data to multi-value CMY data; a second program process for converting the multi-value CMY data to binary CMY data; and a third program process for converting the binary CMY data to binary CMYK data of the full-color print data.

14. The print control method according to claim 12, wherein the host computer executes color program processes following the individual program process when the printer is busy.

15. A system comprising a host computer and a printer which are connected through an interface, the host computer comprising:

a first memory for storing a processing program for print data; and a first processor for determining a processing program position in the processing program so that data produced by execution of the processing program at the processing program position is balanced with respect to execution between the host computer and the printer and executing the processing program until the processing program position has been executed to produce incompletely-processed data which is transferred to the printer through the interface, and the printer comprising:

a second memory for storing the processing program for print data; and a second processor for executing the processing program following the processing program position to produce completely-processed data.

16. The system according to claim 15, wherein the processing program comprises a plurality of commands from which the processing program position is determined as a command.

17. The system according to claim 15, wherein the first processor of the host computer sends a print request to the printer when the processing program position has been executed and, when the printer is busy, restarts execution of the processing program at a point following the processing program position to produce processed data.

18. A printer for producing print data from input data which is received from a host computer connected to the printer through an interface, comprising:

a memory for storing a processing program for print data, the processing program being the same as that stored in the host computer;

a receiver for receiving incompletely-processed data which is produced by a processing program position which is determined so that data produced at the processing program position is balanced between the host computer and the printer; and a processor for inputting the incompletely-processed data and executing the processing program following the processing program position which is received from the host computer to produce completely-processed data.

19. The printer according to claim 18, wherein the processing program comprises a plurality of commands from which the processing program position is determined as a command.

* * * * *